July 26, 1955 R. W. WIESEMAN 2,714,173
EDGEWOUND COIL CONSTRUCTION
Filed May 28, 1954
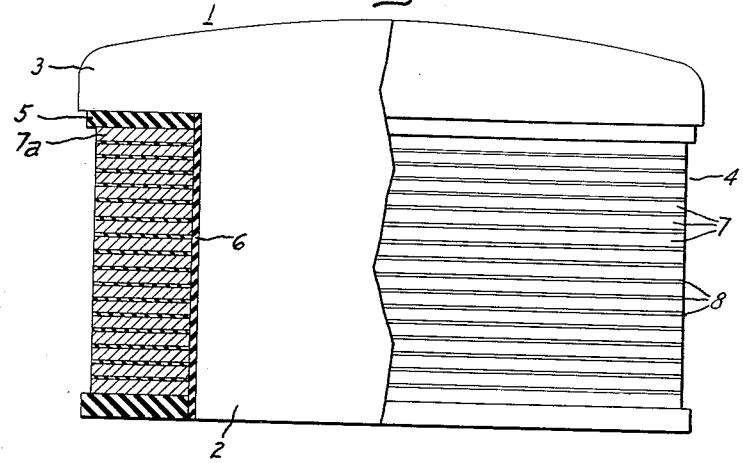
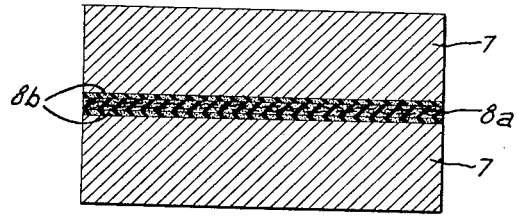
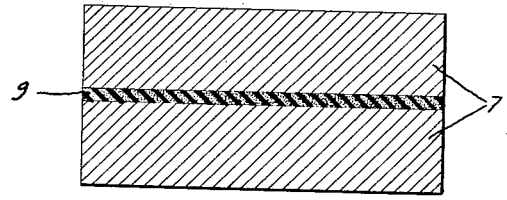
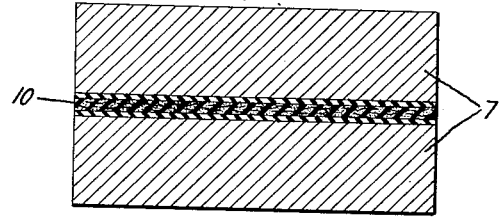
Inventor:
Robert W. Wieseman,
by Claude A. Mott
His Attorney.

United States Patent Office 2,714,173
Patented July 26, 1955

2,714,173

EDGEWOUND COIL CONSTRUCTION

Robert W. Wieseman, Schenectady, N. Y., assignor to General Electric Company, a corporation of New York Application May 28, 1954, Serial No. 433,031

10 Claims. (Cl. 310—194)

My invention relates to dynamoelectric machines and more specifically to insulated coils for the salient pole rotors of high voltage, high capacity dynamoelectric machines.

For approximately 50 years the commonly used insulation between adjacent turns of edgewise wound field coils on such machines has consisted of layers of asbestos paper cemented to the edgewound conductors by a shellac or similar bonding material. In the manufacture of these coils they have been hot pressed in a hydraulic press to produce a solid unitary coil of the required dimensions in which the insulation held the coil together and insulated adjacent turns. Although such coils, weighing up to a ton each, have given very good service under most operating conditions, difficulties have occasionally been encountered under certain conditions due to the enlargement and permanent set of the top turns of the coil with the result that the coils must be removed from the machine and repaired after a period of several years. For example, where such machines are operated under peak load conditions at high speeds for long periods of time, the higher coefficient of expansion of the conductor causes the turns of the coil to become slightly spaced from the core of the pole to form a peripheral gap therebetween. If the load is decreased while the machine is still operating at high speed, the coil cools and retracts to its normal position with respect to the core. Since frictional resistance between the top turn of the coil and the pole tip insulation resists this contraction, the insulating layer between the top turns of the coil may fracture under the shear forces applied, and the top turns do not have the tensile strength to return to their initial size unaided but rather adopt a permanent deformation. Subsequent similar heating and cooling cycles may further increase this deformation until the top turn of the coil extends beyond the end of the pole tip to the point where the pole tip can no longer provide adequate support. Since asbestos is a soft material which cannot be readily impregnated by the shellac, or similar bonding material, it provides a weak shear section in the insulation and upon fracture provides low friction slippage surfaces. Further, asbestos may contain conducting particles and salts, and has a certain amount of affinity for water. This gives rise to other problems relating to electrical short-circuits between adjacent turns of the coil.

Accordingly, it is an object of my invention to provide a coil construction overcoming the above-listed problems.

It is a further object of my invention to provide means for increasing the fracture strength of the insulation between adjacent turns of a field coil.

A further object of my invention is to provide means to increase the maximum force preventing relative movement between adjacent turns of the field coil to a value greater than the frictional forces between the top turn and the pole tip insulation under all operating conditions.

A still further object of my invention is to provide an improved insulation between adjacent turns of a coil for a salient pole rotor.

Another object of my invention is to provide an improved coil construction having a higher resistance to relative lateral movement of adjacent turns combined with improved thermal conductivity and more positive prevention of short circuits between adjacent turns.

Still another object of my invention is to provide an improved reinforced insulation layer for a coil of a dynamoelectric machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a fragmentary end view of a coil, partly in section, embodying one form of my invention.

Fig. 2 is an enlarged cross sectional view of a pair of turns of the coil of Fig. 1 illustrating a preferred form of my invention at an intermediate step in the manufacture of the coil.

Figs. 3 and 4 are enlarged cross sectional views similar to Fig. 2 illustrating modifications of my invention.

Briefly stated, in accordance with one aspect of my invention, the insulation between the conducting turns of edgewound field coils is formed of reinforced glass fiber mat made with heavy textile fibers which is impregnated with a thermosetting vinyl-modified phenolic bonding material which, when heated, converts into a hard solid by polymerization while maintaining the flexibility necessary to withstand the thermal and vibrational forces encountered by the coil. The bonding material impregnates the glass mat and cements it to the adjacent turns to produce a unitary coil construction having a plurality of turns cemented to each other through an insulating layer of high thermal conductivity and high shear strength coupled with means insuring a positive spacing between adjacent turns at all contiguous points to prevent short circuits. Pressing of the coil under heat during manufacture causes the individual glass fibers to become slightly imbedded in the surface of the turns of the conductor to greatly increase the resistance of the coil to shear forces tending to break the adhesive bond between the insulation and adjacent turns to insure that the insulation will expand and contract with the conductor. In the event of fracture along a plane through the insulation, the abrasive ends of the glass fibers greatly increase the slippage resistance in the fracture plane. Sand may be added to the bonding material to further increase the dielectric strength and fracture strength insulation.

This improved insulation construction may be confined to use between approximately the top inch of turns of a given coil or it may be used between all the turns of the coil.

Referring now to the drawing, I have shown in Fig. 1 a salient rotor pole construction 1 for a high speed, high capacity dynamoelectric machine. The pole embodies a magnetic core 2 and pole tips 3 to support a coil 4 on the machine and restrain it from radial movement under the influence of centrifugal force.

The coil 4 is insulated from the pole tips 3 by an insulating collar 5 and is separated from magnetic core 2 by means of an insulating sleeve 6.

Coil 4 is formed of a plurality of edgewound turns 7 of a material having high electrical conductivity such as copper or aluminum insulated from each other and held together by means of between-turn insulation 8, and, as used, the coil 4 is maintained in the form of a unitary structure by the insulation layers 8.

In accordance with the preferred embodiment of my invention, means for securing adjacent turns of the coil together and electrically insulating the turns from each other is provided. As best shown in Fig. 2, which shows a diagrammatic representation of the insulation layer 8 prior to its being pressed and cured, the adjacent turns 7 of coil 4 are secured together by a bonding material which, upon solidifying, remains solid and yet maintains a dimensional flexibility compatible with the turns 7 throughout the range of operating temperatures. The bonding material also strongly adheres to the coil turns.

A suitable bonding material for this use is a composition comprising a resin such as any of the commercially available phenol formaldehyde, analine formaldehyde, analine modified phenol formaldehyde, etc., resins as the major ingredients. This composition should also include as a modifying minor ingredient an elasatomer such as natural or synthetic rubber or a thermoplastic vinyl resin such as polyvinyl chloride, polyvinyl acetate, polyvinyl alcohol, polyvinyl butyrate, etc., resin. One group of bonding material particularly suitable for use in the present invention is the class of material known commercially as vinyl-modified phenolic resins. It is preferable that the thermosetting ingredient be in the composition in the ratio of 3 to 4 parts to 1 of the modifying ingredient although any mixture in which the thermosetting ingredient dominates may be utilized since the thermosetting ingredients in such a composition will impart strength and temperature stability to the insulation. The modifying minor ingredient imparts flexibility and adhesiveness to the composition to greatly increase its adhesion to the conductors and to provide the composition with flexibility to insure that the insulation for the thermal will expand and contract with the coil without fracture or breaking its bond with the conductor.

In accordance with the present invention, means are also provided for reinforcing the bonding material to increase its ultimate shear strength. Such means, as shown in Fig. 2, comprises a glass fiber mat 8a which is impregnated with bonding material. The bonding material used for impregnating the mat 8a may have both the major and minor ingredients as hereinbefore described, or the minor ingredient may be eliminated with satisfactory results. I have found it desirable to fill voids in the glass mat with a very fine inorganic filler, such as powdered silica having a grain diameter in the order of 1 to 3 microns, for increased dielectric and mechanical strength. Such filling can conveniently be done by suspending the powder in the bonding material used in impregnating the glass mat.

Means are also provided for insuring the positive spacing of the adjacent turns of the coil to prevent contact of adjacent turns 7 under the influence of high local pressures which may be encountered during the pressing of the coil. While the glass fiber mat additionally serves this purpose, in the preferred form of my invention I provide a finely-divided, hard, heat-conducting chemically inert coarse grit or filler, such as a silica sand distributed throughout the bonding material 8b. I have found that said having a grain size in the order of 90 mesh is satisfctory for this purpose. One-half pound of sand to five pounds of bonding material has been found to providing a satisfactory mixture although this mixture is not critical.

A coil as represented by Fig. 2 is manufactured as follows: The bonding material 8b having coarse filler therein is coated on the sides of the coil turns and dried. The glass fiber mat dimensioned to the proper width is impregnated with bonding material, as hereinbefore described, and placed between adjacent turns. The coil is then heated to a temperature sufficient to set the bonding material and compressed to its final dimensions in a hydraulic press. This causes the bonding material 8b to adhere tightly to the turns 7 and to join the glass mat 8a to the turns. At the same time, the coarse sand becomes embedded in the turns 7 and in the glass mat 8a to lock these members together. The hardness of the glass fibers cause them to become slightly embedded in the surfaces of the turns 7 to additionally lock the insulation to the turns 7. Thus the adjacent turns 7 of the coil 4 are secured to each other by means of the solid, flexible bonding material reinforced by the glass fiber mat and the silica sand without a weak shear section. Moreover, glass and silica are fairly good conductors of heat, and the transfer of heat between the adjacent turns 7 is improved to thereby insure more even expansion and contraction of the coil turns. This reduces the shear stresses which are imposed on the insulation during use. Further, such an insulating layer has the added advantages of being chemically inert and non-absorbent. This, coupled with the absence of conducting salts or impurities, results in a coil free of electrical short-circuits or leakage paths in the insulation between adjacent turns even if the thickness of the between-turn insulation is reduced to ⅓ of the dimension required for such insulation prior to my invention.

The insulating layer 8 of my invention may be utilized as between-turn insulation for the entire coil, or, if desired, may be limited to the top inch of the coil since the greatest shear forces are impressed upon the insulation at this portion of the coil.

Referring now to Fig. 3, I have shown a modified form of my invention in which an insulation layer 9 is formed of a bonding material, as hereinbefore described, and is reinforced by the addition of inorganic coarse grit such as silica sand alone. In this construction the silica sand provides a positive spacer between adjacent turns 7 to insure against their coming into contact with each other. Moreover, the silica sand serves as a reinforcement for the bonding material and serves to increase its shear strength, and, in the event of fracture of the insulation layer 9 during use, the particles of sand produce abrasive high friction slippage surfaces along the fracture. This modified coil construction is preferably made by applying a heavy coating of bonding material to each of the facing sides of turns 7 and partially curing prior to the final heating and pressing of the coil.

Referring now to Fig. 4, I have shown another form of my invention in which the insulation layer 10 is formed of a bonding material, as hereinbefore described, reinforced by the use of a glass fiber mat formed of heavy textile fibers alone. In this construction the fibers are matted to reinforce the insulation in every direction and to act as positive spacers for the turns 7, as well as to produce a high friction slippage plane in the event of fracture. In this form of my invention, glass mat fibers of a sufficient size are selected to serve as the positive spacer to prevent short-circuiting of adjacent coils. I have found that multi-filament textile fibers having a diameter of approximately 10 mils can withstand the high local pressures encountered during manufacture and insure the positive spacing of the turns. As discussed above in connection with the embodiment of Fig. 2, it is again desirable to fill the voids of the glass mat with a powdered inorganic filler prior to assembly for increased dielectric and mechanical strength.

While in my improved construction shear fractures will seldom occur, should a fracture occur it will result in high friction slippage surfaces formed of a plurality of rough ends of the broken glass fibers. Tests have indicated that the proposed construction utilizing textile glass fibers alone has about six times the resistance to relative movement along such a fracture plane as have conventional constructions.

Since the fracture of the between-turn insulation results where the frictional forces between the insulating collar 5 and the adjacent coil turn 7 is greater than the fracture strength of the insulation 8 between adjacent turns, the frictional resistance between top turn 7a and insulating collar 5 may be reduced, if desired, by a low friction coating such as a non-corrosive lubricating material, for example, molybdenum disulfide or a plating of metal such as nickel.

While I have illustrated and described particular embodiments of my invention, further modifications and improvements thereof will occur to those skilled in the art. I desire it to be understood, therefore, that my invention is not limited to the particular forms shown, and I intend in the appended claims to cover all modifications which do not depart from the spirit and scope of my invention.

What I claim as new and desire to secure by Letters Patent of the United States is:

1. A rotatable salient pole construction for a dynamoelectric machine comprising a pole piece formed of magnetic material, an edgewound coil for said pole piece, means insulating said coil from said pole piece and means insulating adjacent turns of said coil from each other, said last-mentioned means comprising bonding material and permeable positive spacing means to insure a minimum thickness of insulation between adjacent turns, said spacing means being partially embedded in the turns to increase the shear strength of the adhesive bond between the insulation and the turns.

2. A salient pole construction for the rotor of a dynamoelectric machine comprising a pole piece formed of magnetic material, an edgewound coil for said pole piece, means insulating said coil from said pole piece and means insulating adjacent turns of said coil from each other, said last-mentioned means comprising a bonding material and a reinforced glass fiber mat formed of heavy textile fibers to provide a minimum thickness of insulation between adjacent turns of said coil, the fibers of said mat being partially embedded in the surface of adjacent turns of said coil to increase the value of the shear forces required to cause relative lateral movement between adjacent turns of said coil.

3. A rotatable salient pole construction comprising a pole piece formed of magnetic material, an edgewound coil for said pole piece, means insulating adjacent turns of said pole piece from each other, said means comprising a modified thermosetting bonding material having coarse particles of a grain size of the order of 90 mesh distributed therethrough to provide a minimum thickness of insulation between adjacent turns of said coil, said particles being partially embedded in the surface of said turns to increase the shear strength of the adhesive bond between the insulation and the turns.

4. A salient pole construction for the rotor of a dynamoelectric machine comprising a pole piece formed of magnetic material, an edgewound coil for said pole piece, means insulating adjacent turns of said coil from each other, said means comprising a glass fiber mat formed of textile fibers having a diameter of approximately 10 mils between adjacent turns, a bonding material adhering to said turns and impregnating said mat, and a filler dispersed throughout said bonding material for filling the voids in the glass fiber mat, the textile fibers of said mat being partially embedded in the surface of adjacent turns of said coil to increase the shear strength of the adhesive bond between the insulation and the coil.

5. A salient pole construction for the rotor of a dynamoelectric machine comprising a pole piece formed of magnetic material, an edgewound coil for said pole piece, means insulating said coil from said pole piece and means insulating adjacent turns of said coil from each other, said last-mentioned means comprising a vinyl-modified phenolic resin and a reinforced glass fiber mat having heavy textile fibers partially embedded in the surface of said turns to increase the shear strength of the adhesive bond between the insulation and the turns, and a filler dispersed throughout said glass mat to fill the voids thereof.

6. An edgewound coil for use on a rotatable salient pole of a dynamoelectric machine comprising a plurality of edgewound turns of conducting material and means providing electric insulation between said turns and securing said turns to one another, said means comprising a permeable material which upon fracture provides surfaces of high frictional resistance in the fracture plane, a bonding material impregnating said permeable material and securing said permeable material to said turns, and means between the top turn of the coil and the insulating collar of the pole tip to reduce the friction therebetween.

7. In a coil construction for use on a salient pole of the rotor of a dynamoelectric machine, a plurality of edgewound turns, means for electrically insulating adjacent turns of the coil comprising permeable spacing means and a bonding material filling the voids in said spacing means and adhering to the adjacent turns to secure the same together, said spacing means having portions partially embedded in the surface of said turns to increase the value of the shear forces necessary to cause relative lateral movement between adjacent turns of said coil.

8. The device as recited in claim 7, wherein the bonding material comprises a composition including a thermosetting resin as a major ingredient and a thermoplastic material as a minor ingredient.

9. A rotatable salient pole construction comprising a pole piece formed of magnetic material, an edgewound coil for said pole piece, means insulating adjacent turns of said coil from each other, said means comprising a glass fiber mat formed of heavy textile fibers between adjacent turns, a bonding material adhering to said turns and impregnating said mat, an inorganic powdered filler filling the voids in said mat to increase the dielectric strength thereof, and a coarse silica sand filler partially embedded in said turns to increase the shear strength of the adhesive bond between the insulation and said turns to lock said glass mat to said turns.

10. In a coil construction for use on the salient pole of a rotor of a dynamoelectric machine and having a plurality of edgewound turns, means for electrically insulating adjacent turns of the coil comprising permeable inorganic spacing means partially embedded in said turns to increase the shear force necessary to cause relative lateral movement between adjacent turns of said coil and a bonding material filling the spaces between said spacing means and adhering to the adjacent turns to secure the same together, said bonding material comprising a composition having a thermosetting resin as the major ingredient and a minor ingredient for modifying said composition to impart flexibility and adhesiveness thereto.

References Cited in the file of this patent

UNITED STATES PATENTS

| | | |
|---|---|---|
| 824,048 | Thomson | June 19, 1906 |
| 1,381,567 | Kuttner | June 14, 1921 |
| 2,517,105 | Greer | Aug. 1, 1950 |